(12) United States Patent
Ohara

(10) Patent No.: US 10,703,058 B2
(45) Date of Patent: Jul. 7, 2020

(54) TIRE VULCANIZING MOLD

(71) Applicant: Toyo Tire Corporation, Itami-shi, Hyogo (JP)

(72) Inventor: Masaaki Ohara, Itami (JP)

(73) Assignee: TOYO TIRE CORPORATION, Itami-shi (JP)

( * ) Notice: Subject to any disclaimer, the term of this patent is extended or adjusted under 35 U.S.C. 154(b) by 0 days.

(21) Appl. No.: 16/327,028

(22) PCT Filed: Sep. 28, 2016

(86) PCT No.: PCT/JP2016/004384
§ 371 (c)(1),
(2) Date: Feb. 21, 2019

(87) PCT Pub. No.: WO2018/061055
PCT Pub. Date: Apr. 5, 2018

(65) Prior Publication Data
US 2019/0184660 A1    Jun. 20, 2019

(51) Int. Cl.
*B29D 30/06* (2006.01)
*B29C 35/02* (2006.01)
(Continued)

(52) U.S. Cl.
CPC .......... *B29D 30/0606* (2013.01); *B29C 33/10* (2013.01); *B29C 35/02* (2013.01);
(Continued)

(58) Field of Classification Search
CPC ............... B29D 30/0606; B29D 30/72; B29D 2030/0616; B29D 2030/0617
See application file for complete search history.

(56) References Cited

U.S. PATENT DOCUMENTS 5,382,402 A * 1/1995 Espie ................. B29C 33/10
156/394.1
6,491,854 B1 * 12/2002 Sano ................. B22D 19/00
164/24
(Continued)

FOREIGN PATENT DOCUMENTS

JP    63-264308 A    11/1988
JP   H02-100826 A    4/1990
(Continued)

OTHER PUBLICATIONS

International Search Report dated Nov. 15, 2016, issued in counterpart application No. PCT/JP2016/004384 (2 pages).
(Continued)

*Primary Examiner* — James P Mackey
(74) *Attorney, Agent, or Firm* — Westerman, Hattori, Daniels & Adrian, LLP

(57) ABSTRACT

A tire vulcanizing mold includes an upper and lower pair of side molds having side shaping surfaces. Each of the side molds includes: a side mold main body including plural recesses, each being opened to corresponding one of the side shaping surfaces at spaced intervals; plural pieces, each of which is fitted into the recess; and clearances provided between the side mold main body and each of the pieces. Each of the recesses includes: an outer-side inner wall surface defining an outer side in a tire radial direction; an inner-side inner wall surface defining an inner side; a pair of radial inner wall surfaces that are located between the outer-side inner wall surface and the inner-side inner wall surface and define one side and the other side in the tire circumferential direction; and a curved surface that connects the outer-side inner wall surface and the radial inner wall surface.

3 Claims, 9 Drawing Sheets

(51) Int. Cl.
  *B29C 33/10* (2006.01)
  *B29D 30/72* (2006.01)
(52) U.S. Cl.
  CPC ...... *B29D 30/72* (2013.01); *B29D 2030/0612* (2013.01); *B29D 2030/0616* (2013.01); *B29D 2030/0617* (2013.01)

(56) References Cited

U.S. PATENT DOCUMENTS 7,021,914 B2 * 4/2006 Hanya .................... B29C 33/10
    249/141
2007/0259063 A1 * 11/2007 Tanaka .................... B29C 33/10
    425/36

FOREIGN PATENT DOCUMENTS

| | | |
|---|---|---|
| JP | H08-132447 A | 5/1996 |
| JP | 2000-202832 A | 7/2000 |
| JP | 2001-162446 A | 6/2001 |
| JP | 2001-179751 A | 7/2001 |
| JP | 2002-307441 A | 10/2002 |
| JP | 2005-297353 A | 10/2005 |
| JP | 2012-135897 A | 7/2012 |
| JP | 2014-172360 A | 9/2014 |
| JP | 2015-051605 A | 3/2015 |
| JP | 2016-74170 A | 5/2016 |

OTHER PUBLICATIONS

Third Party Observation (Submission of Publication) dated Mar. 16, 2020, issued in counterpart JP Application No. 2018-541727, with English Translation. (30 pages).

* cited by examiner

[FIG. 1]
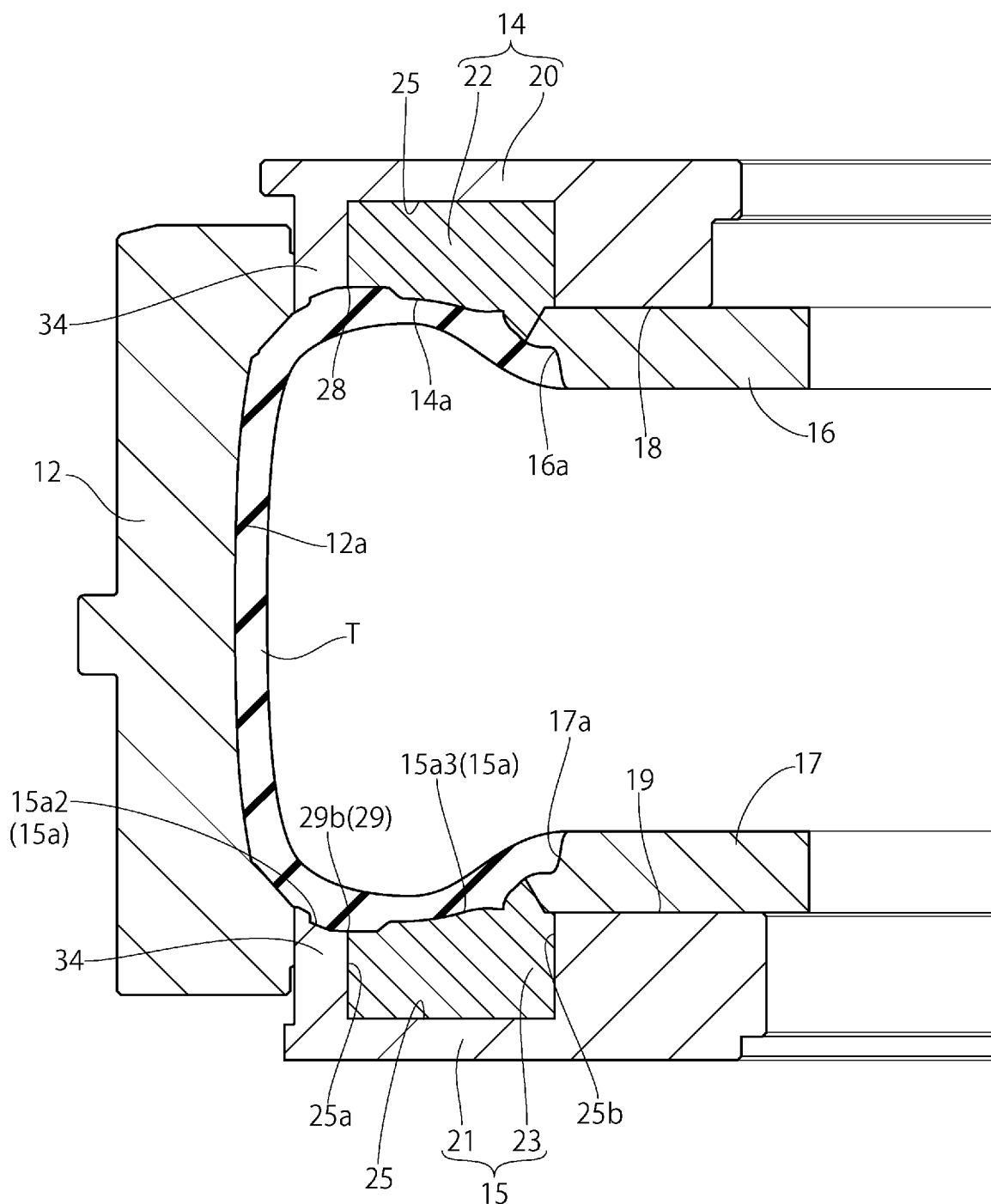

[FIG. 2]
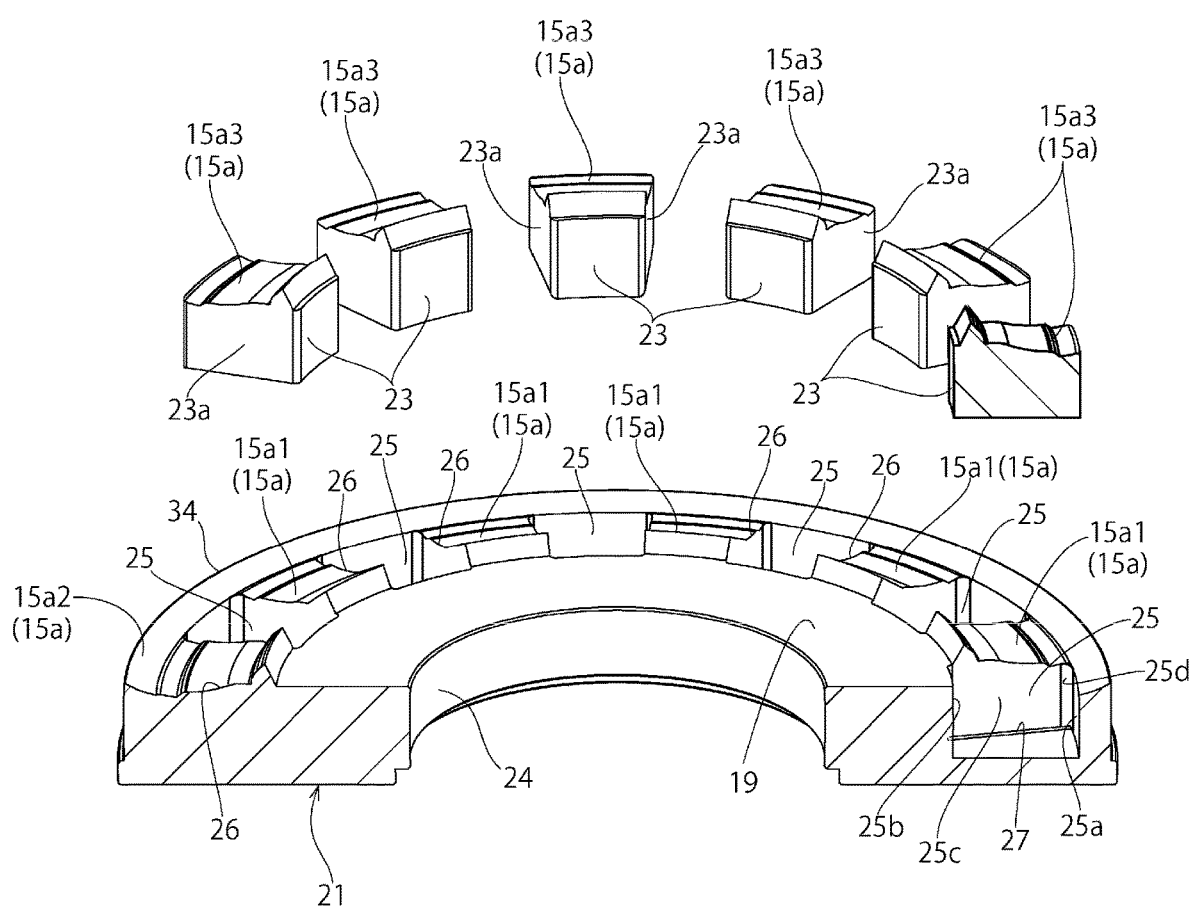

[FIG. 3]
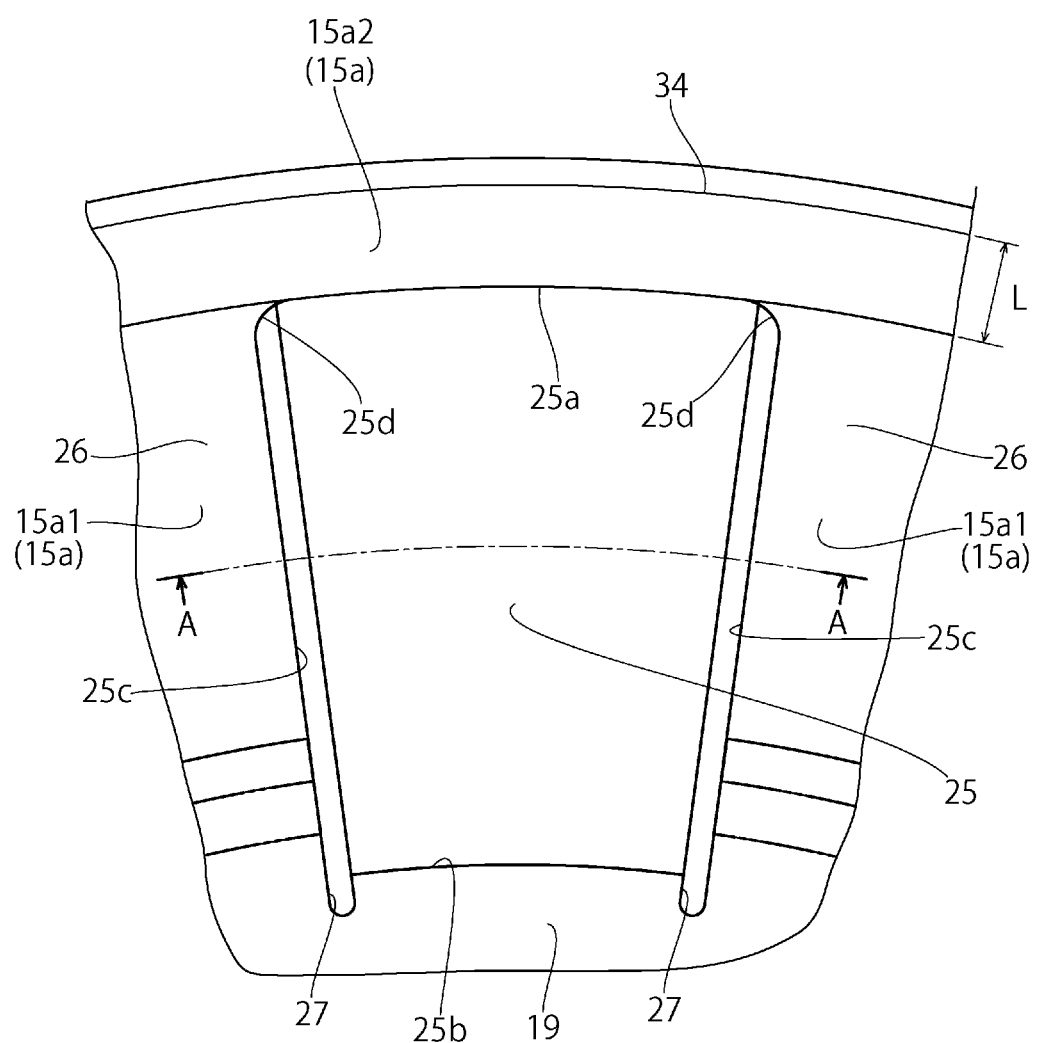

[FIG. 4]
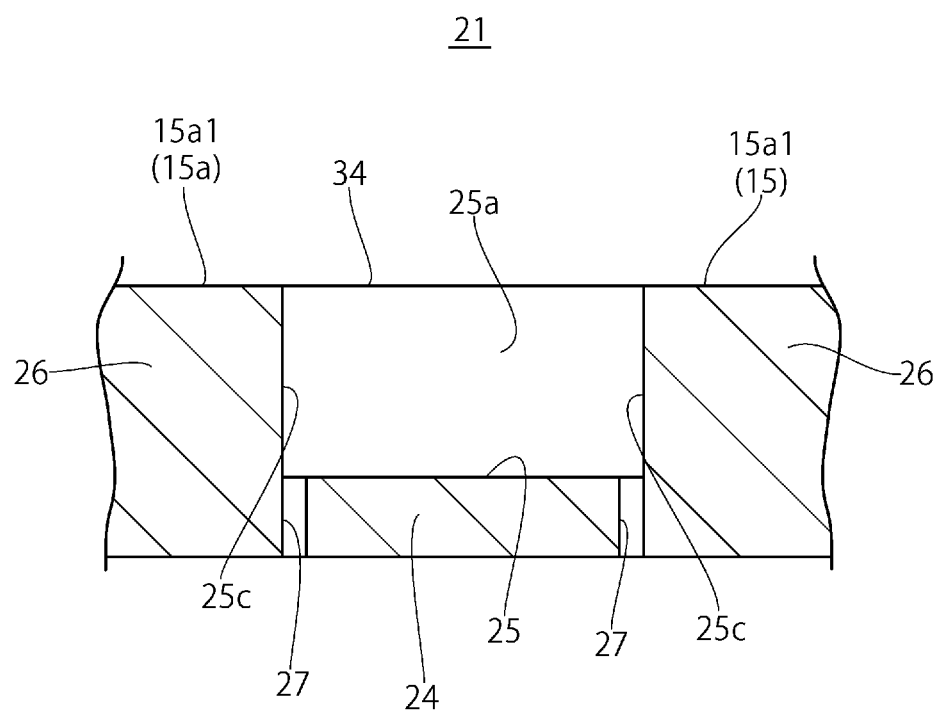

[FIG. 5]
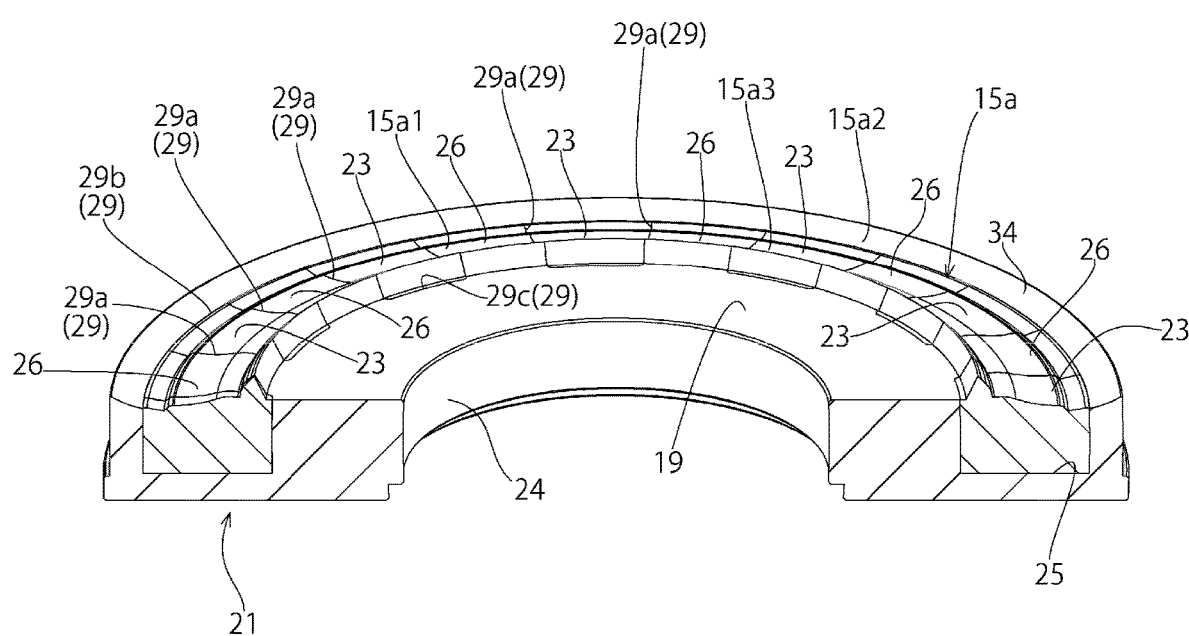

[FIG. 6]
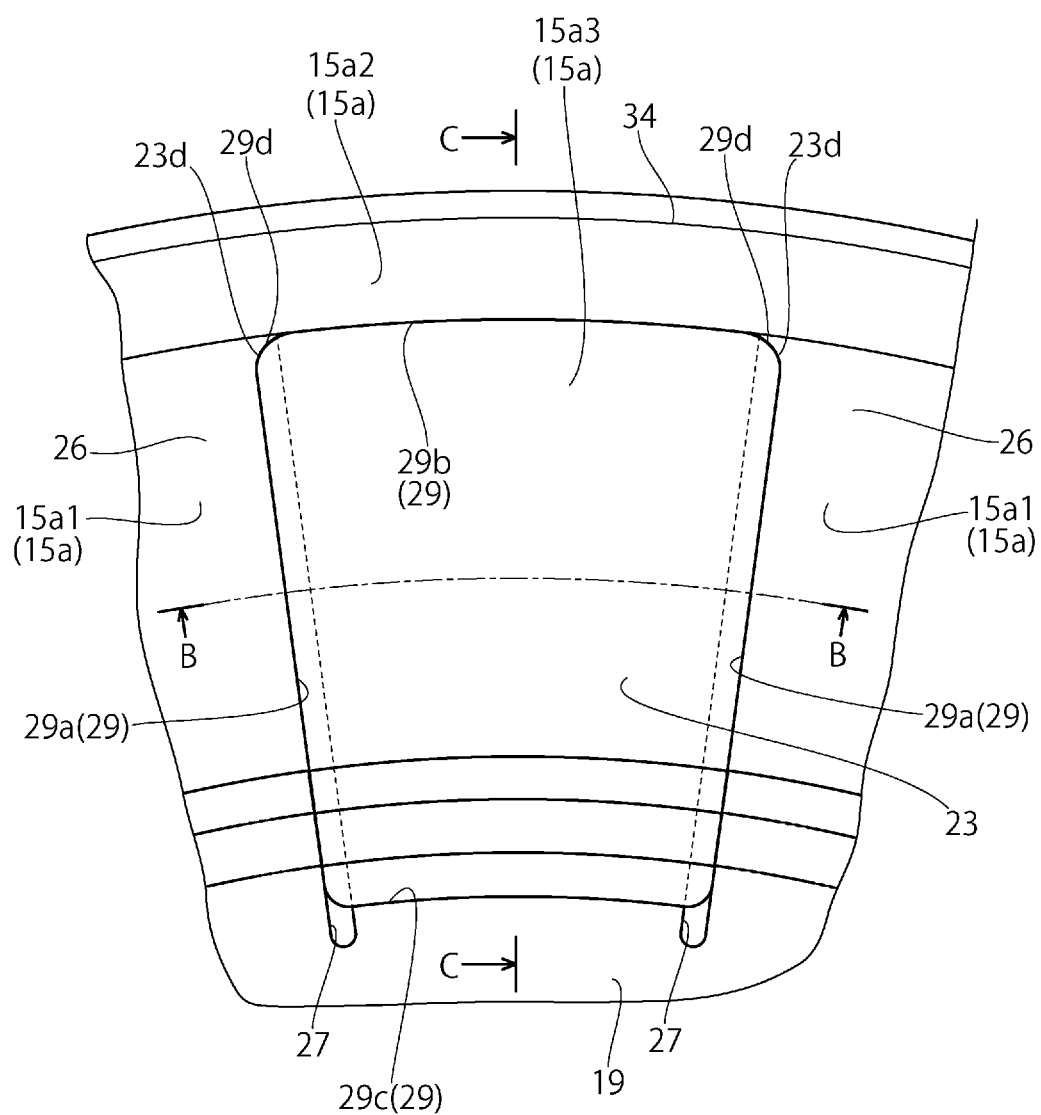

[FIG. 7]
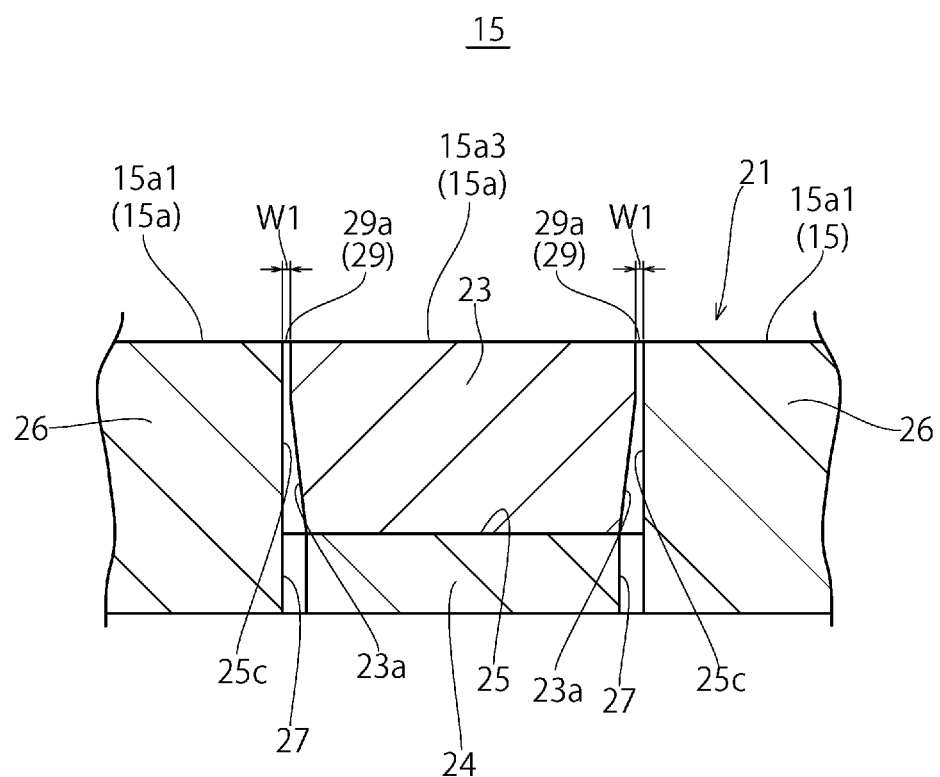

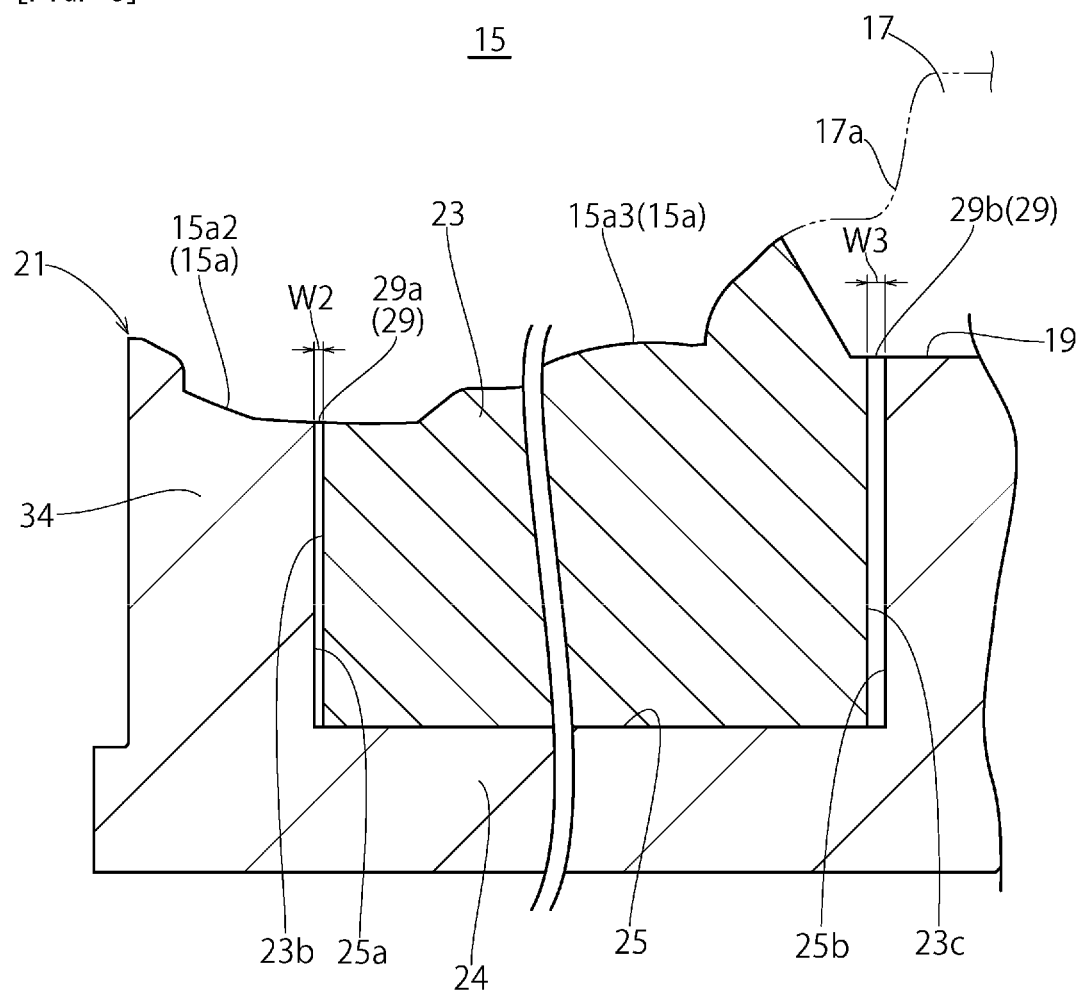
[FIG. 8]

[FIG. 9]
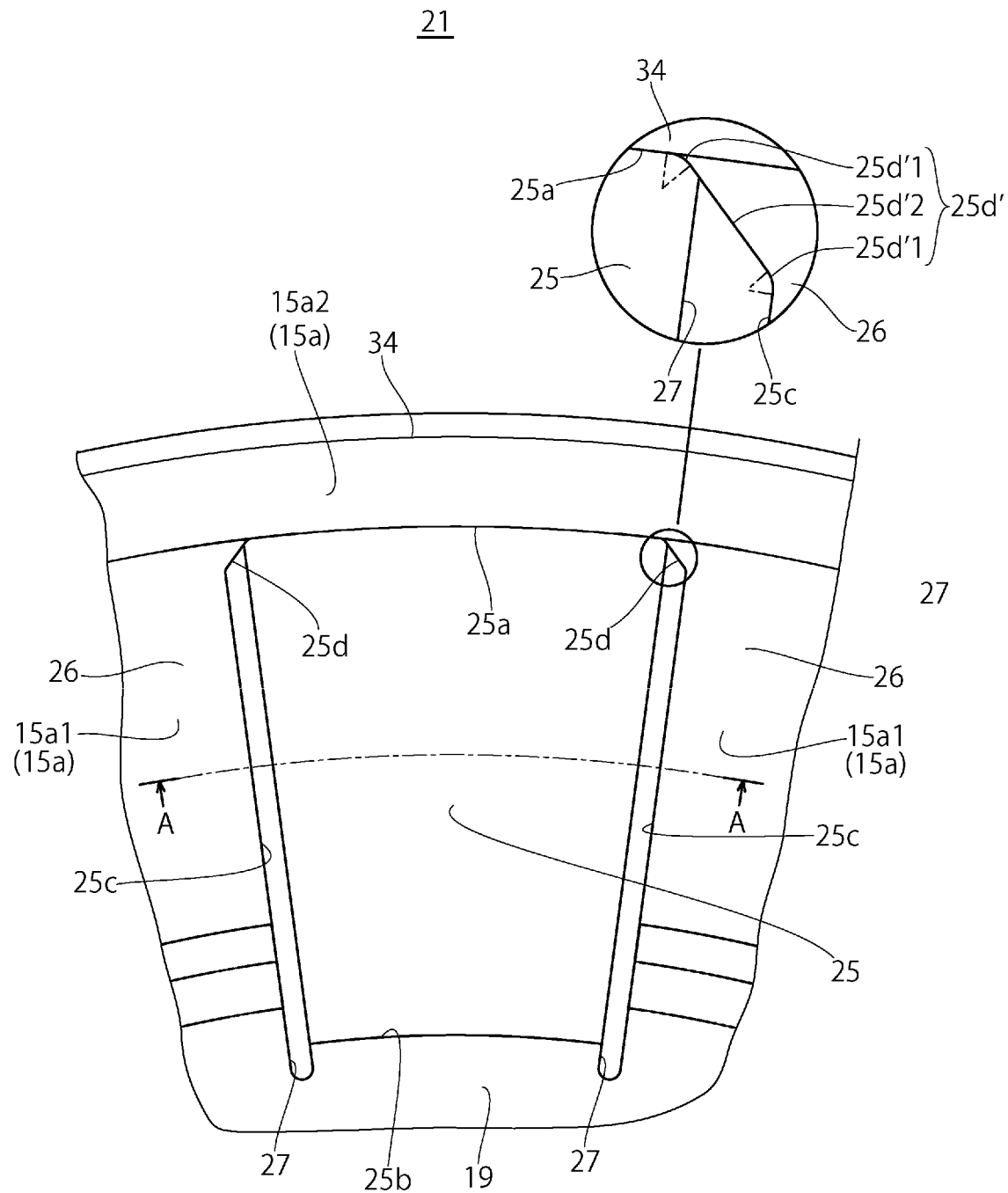

TIRE VULCANIZING MOLD

TECHNICAL FIELD

The present invention relates to a tire vulcanizing mold.

Background Art

A tire is manufactured by building an unvulcanized green tire and vulcanizing and shaping the green tire in a specified shape by using a tire vulcanizing mold.

The tire vulcanizing mold including: a tread mold having a tread shaping surface for shaping a tread of the tire; an upper and lower pair of side molds, each of which has a side shaping surface for shaping a sidewall of the tire; and an upper and lower pair of bead rings, each of which has a bead shaping surface for shaping a bead of the tire has been known.

It has been known that shaping defect occurs in such a tire vulcanizing mold. The shaping defect is formation of a dent (an uplift) or the like on an outer surface of the tire due to retention of air between the green tire and the tire vulcanizing mold. Such shaping defect is likely to occur on a side surface of the tire including the sidewall where a rubber volume is relatively small.

To handle such a problem, a tire vulcanizing mold has been proposed in PTL 1. The tire vulcanizing mold is formed with the ring-shaped side mold by arranging plural side segments, which are divided in a tire circumferential direction, in the tire circumferential direction. In this tire vulcanizing mold, plural clearances, each of which extends in a tire radial direction, are formed on the side shaping surface by using mating surfaces of the side segments, and the air existing between the green tire and the side mold is released from each of these clearances.

CITATION LIST

Patent Literature

PTL 1: JP-A-2012-135897

SUMMARY OF INVENTION

Technical Problem

However, in the tire vulcanizing mold as described above, the side mold, which includes the side shaping surface, is formed by coupling the plural side segments. Thus, a dimension error existing in each of the side segments and an assembly error generated at the time of coupling the side segments are accumulated. As a result, it becomes difficult to accurately provide the clearances, from which the air existing between the green tire and the side mold is released, on the side shaping surface and causes such a problem of the shaping defect that the rubber spills out of the excessively large clearance, that the dent is formed on the outer surface of the tire due to insufficient air releasing performance resulted from the excessively small clearance, or the like.

In view of the above, it is considered to fit a piece into a recess that is opened to the side shaping surface, and form the clearance, which is opened to the side shaping surface, around the piece, so as to release the air existing between the green tire and the side mold from this clearance. In such a tire vulcanizing mold, an attachment position error, which occurs when the piece is fixed, is not accumulated. However, there is a problem that it is difficult to accurately form an inner corner of the recess and that it is difficult to accurately provide the clearance, which is formed around the piece, in a desired width.

The present invention has been made in view of the above problem and therefore has a purpose of providing a tire vulcanizing mold capable of accurately providing a recess opened to a side shaping surface and accurately providing a clearance, from which air existing between a green tire and a side mold is released, on the side shaping surface.

Solution to Problem

A tire vulcanizing mold according to the present invention is a tire vulcanizing mold that vulcanizes and shapes a tire and includes an upper and lower pair of side molds, each of which has a side shaping surface for shaping a sidewall of the tire. Each of the side molds includes a side mold main body, plural pieces, and a clearance. The side mold main body includes plural recesses, each of which is opened to the side shaping surface, at spaced intervals in a circumferential direction. Each of the pieces is fitted into the recess and forms the side shaping surface with the side mold main body. The clearance is provided between the side mold main body and each of the pieces and is opened to the side shaping surface. The recess includes: an outer-side inner wall surface that defines an outer side in a tire radial direction; an inner-side inner wall surface that defines an inner side in the tire radial direction; a pair of radial inner wall surfaces that are located between the outer-side inner wall surface and the inner-side inner wall surface and define one side and the other side in a tire circumferential direction; and a curved surface that connects the outer-side inner wall surface and the radial inner wall surface.

In a preferred aspect of the present invention, the curved surface may be an arcuate surface in an arcuate shape, a curvature radius of which is equal to or larger than 1 mm.

In another preferred aspect of the present invention, the pieces may include two or more types of the pieces that have different lengths in the tire circumferential direction.

In yet another preferred aspect of the present invention, a distance between the inner-side inner wall surface and each of the piece maybe equal to or longer than 0.5 mm, and a distance between each of the pieces and each of the outer-side inner wall surface and the radial inner wall surface may be equal to or shorter than 0.05 mm.

Advantageous Effects of Invention

In the tire vulcanizing mold according to this embodiment, the recesses, each of which is opened to the side shaping surface, can accurately be provided, and the clearance, from which the air existing between the green tire and each of the side molds is released, can accurately be provided on the side shaping surface.

BRIEF DESCRIPTION OF DRAWINGS

FIG. 1 is a cross-sectional view of a tire vulcanizing mold according to a first embodiment;

FIG. 2 is a perspective cross-sectional view illustrating a side mold in an exploded manner;

FIG. 3 is an enlarged plan view of main sections of a side mold main body;

FIG. 4 is a cross-sectional view taken along A-A in FIG. 3;

FIG. 5 is a perspective cross-sectional view of the side mold;

FIG. 6 is an enlarged plan view of main sections of the side mold;

FIG. 7 is a cross-sectional view taken along B-B in FIG. 6;

FIG. 8 is a cross-sectional view taken along C-C in FIG. 6;

FIG. 9 is an enlarged plan view of main sections of a side mold main body in a tire vulcanizing mold according to a modified embodiment.

DESCRIPTION OF EMBODIMENTS

First Embodiment

A description will hereinafter be made on a first embodiment with reference to the drawings.

FIG. 1 is a cross-sectional view of a tire vulcanizing mold 10 according to this embodiment. This tire vulcanizing mold 10 is a shaping mold used to heat and pressurize an unvulcanized green tire T for vulcanization molding, and the unvulcanized green tire T is set in the tire vulcanizing mold 10 such that a tire axial direction is vertically arranged. The tire vulcanizing mold 10 includes a tread mold 12, an upper and lower pair of side molds 14, 15, and an upper and lower pair of bead rings 16, 17.

The tread mold 12 is a mold having a tread shaping surface 12a that shapes a tread of a tire. The tread mold 12 includes plural sectors that are divided in a tire circumferential direction. The plural sectors are provided such that each thereof can be displaced in a manner to increase/reduce a diameter in a tire radiation direction (a tire radial direction). In a mold closed state where each of the sectors is arranged at a mold closed position, the adjacent sectors in the tire circumferential direction gather to have a ring shape.

The upper side mold 14 located above the green tire T is a ring-shaped mold having a side shaping surface 14a that shapes an upper sidewall of the green tire T. The lower side mold 15 located below the green tire T is a ring-shaped mold having a side shaping surface 15a that shapes a lower sidewall of the green tire T.

The bead ring 16 is an upper bead ring that is placed on a bead ring fixing section 18 of the upper side mold 14 and is fixed thereto by a bolt or the like. The upper bead ring 16 is a mold having a bead shaping surface 16a that shapes an upper bead of the green tire T.

The bead ring 17 is a lower bead ring that is placed on a bead ring fixing section 19 of the lower side mold 15 and is fixed thereto by a bolt or the like. The lower bead ring 17 is a mold having a bead shaping surface 17a that shapes a lower bead of the green tire T.

FIG. 2 is a perspective cross-sectional view illustrating the lower side mold 15 in an exploded manner. In the upper side mold 14 and the lower side mold 15, the side shaping surface 14a and the side shaping surface 15a possibly have mutually different shapes. However, the upper side mold 14 and the lower side mold 15 have the same basic configuration to include side mold main bodies 20, 21, pieces 22, 23, and clearances 28, 29. Thus, a description will herein be made on the lower side mold 15, and a detailed description on the upper side mold 14 will not be made.

The lower side mold 15 includes the side mold main body 21, the plural pieces 23, and the clearance 29 provided between the side mold main body 21 and each of the pieces 23.

The side mold main body 21 has a base 24 in a flat ring shape that is made of a metallic material such as aluminum, an aluminum alloy, or iron. On an inner side of the base 24 in the tire radial direction, the bead ring fixing section 19, which fixes the bead ring 17, is provided. On an outer side of the base 24 in the tire radial direction, plural recesses 25 are provided with a space being interposed therebetween in the tire circumferential direction, plural projections 26 are each provided between the adjacent recesses 25 in the tire circumferential direction in a manner to be projected upward from the base 24, and an annular projection 34 is provided on an outer side of the recesses 25 and the projections 26 in the tire radial direction.

Each of the recesses 25 is a dent that is closed in the tire circumferential direction and the tire radial direction and is opened to the side shaping surface 15a in a plan view (when seen in a tire rotational axis direction). The piece 23 is fitted into each of the recesses 25.

More specifically, as illustrated in FIG. 3 and FIG. 4, each of the recesses 25 includes: an outer-side inner wall surface 25a that extends in the tire circumferential direction and defines the outer side in the tire radial direction; an inner-side inner wall surface 25b that extends in the tire circumferential direction and defines the inner side in the tire radial direction; a pair of radial inner wall surfaces 25c, 25c that are located between the outer-side inner wall surface 25a and the inner-side inner wall surface 25b and define one side and the other side in the tire circumferential direction; and curved surfaces 25d, 25d, each of which connects the outer-side inner wall surface 25a and one of the paired radial inner wall surfaces 25c, 25c.

In this embodiment, the outer-side inner wall surface 25a and the inner-side inner wall surface 25b are arcuate surfaces, and a horizontal cross section of each thereof has a concentric arcuate shape about the tire rotational axis. Each of the radial inner wall surfaces 25c, 25c is a flat surface extending in the tire radial direction. Each of the curved surfaces 25d, 25d is an arcuate surface, and a horizontal cross section thereof has an arcuate shape. For example, each of the curved surfaces 25d, 25d is preferably the arcuate surface in the arcuate shape, a curvature radius of which is equal to or larger than 1 mm.

The inner side of the recess 25 in the tire radial direction extends to the bead ring fixing section 19 and is covered from above with the bead ring 17, which is fixed to the bead ring fixing section 19 (see FIG. 1).

Slits 27, each of which penetrates the base 24 in a thickness direction (an up-down direction), are provided on a bottom surface of the recess 25. The slits 27 are cuts extending in the tire radial direction along the radial inner wall surfaces 25c, 25c, which define the recess 25 in the tire circumferential direction. An inner side of each of the slits 27 in the tire radial direction extends inward in the tire radial direction beyond the inner-side inner wall surface 25b of the recess 25, and an outer side thereof in the tire radial direction terminates at a position of the curved surface 25d, which constitutes a part of the inner wall surface of the recess 25. Note that the outer side of each of the slits 27 in the tire radial direction may extend outward in the tire radial direction beyond the curved surface 25d.

Each of the projections 26 is a projection that is projected upward from the base 24, and is provided radially outward in the tire radial direction from the bead ring fixing section 19. On an upper surface of the projection 26, a part 15a1 that constitutes a part of the side shaping surface 15a is provided.

The annular projection 34 is an annular projection projected upward from the base 24 and continuously provided in the circumferential direction, is provided such that the outer sides of the plural projections 26 in the tire radial direction are coupled thereto, and closes the recesses 25 in the tire radial direction. Together with the side shaping surface 15a1, which is provided in each of the recesses 26, an upper surface of the annular projection 34 constitutes a part 15a2 of the side shaping surface 15a. The annular projection 34 can be set to have any width (that is, a length in the tire radial direction) L. However, from a perspective of securing strength of the annular projection 34, the width L of the annular projection 34 is preferably equal to or greater than 10 mm.

Each of the pieces 23 is formed of the same metallic material as the side mold main body 21, such as aluminum, the aluminum alloy, or iron. Each of the pieces 23 is fitted into the recess 25 of the side mold main body 21. Together with the side mold main body 21, the pieces 23 form the ring-shaped lower side mold 15 as illustrated in FIG. 5. Each of the pieces 23, which is fitted into the recess 25, is fixed to the side mold main body 21 by a bolt or the like. In this embodiment, all of the plural pieces 23 are provided to have equal lengths in the tire circumferential direction.

An upper surface of each of the pieces 23 constitutes a part 15a3 of the side shaping surface 15a. Together with the side shaping surface 15a1 provided in each of the projections 26 and the side shaping surface 15a2 provided in the annular projection 34 of the side mold main body 21, the upper surface of each of the pieces 23 form the side shaping surface 15a.

Each of the pieces 23 is provided such that the lengths thereof in the tire circumferential direction and the tire radial direction are slightly less than those of the recess 25. As a result, in a state where each of the pieces 23 is fitted into the recess 25, the clearance 29 is provided around each of the pieces 23.

More specifically, as illustrated in FIG. 6 to FIG. 8, a first clearance 29a that extends from the inner side to the outer side in the tire radial direction is provided between each of the radial inner wall surfaces 25c, 25c of the recess 25 and each of side walls 23a of the piece 23 opposing these inner wall surfaces 25c, 25c in the tire circumferential direction. A second clearance 29b that extends in the tire circumferential direction is provided between the outer-side inner wall surface 25a of the recess 25 and an outer circumferential wall 23b of the piece 23 opposing this inner wall surfaces 25a in the tire radial direction. A third clearance 29c that extends in the tire circumferential direction is provided between the inner-side inner wall surface 25b of the recess 25 and an inner circumferential wall 23c of the piece 23 opposing this inner-side inner wall surface 25b in the tire radial direction. In addition, a fourth clearance 29d having a constant space is provided between the curved surface 25d of the recess 25 and a curved surface 23d of the piece 23 opposing the curved surface 25d. An end of each of the first clearances 29a and an end of the second clearance 29b are connected via the fourth clearance 29d, and another end of each of the first clearances 29a and an end of the third clearance 29c are connected.

Of the clearances 29a, 29b, 29c, 29d provided around the piece 23, ends on the side shaping surface 15 side (upper ends on the lower side mold 15 side) of the first clearance 29a, the second clearance 29b, and the fourth clearance 29d are opened to the side shaping surface 15a. An end on the side shaping surface 15 side of the third clearance 29c (that is, an opening end thereof that is opened to the side shaping surface 15 side) is closed by the lower bead ring 17 placed on the bead ring fixing section 19 (see FIG. 8). The clearances 29a, 29b, 29c, 29d, which are provided around the piece 23, may at least partially be opened to the side shaping surface 15. For example, only the first clearance 29a may partially be opened, or all of the clearances 29a, 29b, 29c, 29d may be opened.

A lower end of each of the first clearances 29a opposes the slit 27, which is provided at a bottom of the recess 25, and is connected to the slit 27. In this example, each of the slit 27 is provided along a circumferential wall 26a that partitions the recess 25 in the circumferential direction. Accordingly, the entire first clearance 29a vertically overlaps the slit 27 in the tire radial direction and is connected to the slit 27. The second clearance 29b is connected to each of the slits 27 via the first clearance 29a and the fourth clearance 29d.

As described above, the outer side of each of the slits 27 in the tire radial direction terminates at the position of the curved surface 25d of the recess 25. The inner side of each of the slits 27 in the tire radial direction extends inward in the tire radial direction beyond the inner-side inner wall surface 25b of the recess 25. Thus, each of the slits 27 extends in a direction along the first clearance 29a in a manner to be longer than the recess 25.

Each of the first clearance 29a, the second clearance 29b, and the fourth clearance 29d, which is opened to the side shaping surface 15a, is an air releasing clearance, from which air existing between the green tire T and the lower side mold 15 is released to the outside. A dimension of each of the first clearance 29a, the second clearance 29b, and the fourth clearance 29d on the side shaping surface 15a is set such that the air flows therethrough but unvulcanized rubber does not enter. As an example, a width W1 of the first clearance 29a, a width W2 of the second clearance 29b, and a width of the fourth clearance 29d on the side shaping surface 15a are preferably equal to or less than 0.05 mm, may be 0.01 to 0.05 mm, and may further be 0.01 to 0.03 mm.

In regard to the third clearance 29c, which is provided between the inner-side inner wall surface 25b of the recess 25 and the inner circumferential wall 23c of the piece 23, an upper end thereof is closed by the lower bead ring 17 and thus is not opened to the side shaping surface 15a. Thus, a width W3 of the third clearance 29c does not have to be set to such a dimension that the unvulcanized rubber does not enter. The width W3 of the third clearance 29c can be set greater than the widths W1, W2 of the first clearance 29a, the second clearance 29b, and the fourth clearance 29d. As an example, the width dimension of the third clearance 29c is preferably set such that the width W3 of the third clearance 29c is equal to or greater than 0.05 mm and that the third clearance 29c is located inward in the tire radial direction from the lower bead ring 17.

An air releasing path, which is not illustrated, is connected to each of the slits 27. The air existing between the green tire T and the lower side mold 15 flows into the air releasing path through the first clearance 29a, the second clearance 29b, the fourth clearance 29d, and the slit 27, and is released to the outside of the tire vulcanizing mold.

As illustrated in FIG. 7, the piece 23 is provided such that an upper portion thereof (a portion on the side shaping surface 15a2 side) has a constant length in the tire circumferential direction. Meanwhile, the side walls 23a of the piece 23 are bent such that lengths in the tire circumferential direction of a central portion and a lower portion of the piece 23 in the up-down direction are gradually reduced downward. Accordingly, the width W1 of an upper portion of the first clearance 29a is set to such a dimension that the air flows therethrough but the unvulcanized rubber does not enter. The width of the first clearance 29 from the central portion to the lower portion in the up-down direction is gradually increased, and the width of a lower end of the first clearance 29 is equal to the width of the slit 27, which is provided at the bottom of the recess 25.

In the tire vulcanizing mold 10 having the configuration as described above, the lower side mold 15 includes: the side mold main body 21; the pieces 23, each of which is fitted into the recess 25; and the first clearances 29a, the second clearance 29b, and the fourth clearances 29d that are opened to the side shaping surface 15a formed between the side mold main body 21 and each of the pieces 23. Thus, the air existing between the green tire T and the lower side mold 15 can be released to the outside from the first clearances 29a, the second clearances 29b, and the fourth clearances 29d. Therefore, shaping defect caused by retention of the air in the tire vulcanizing mold 10 can be prevented.

The side mold 15 is configured by combining the plural pieces 23. All of the pieces 23 are fixed to the side mold main body 21, and an attachment position error that is generated when the plural pieces 23 are fixed is not accumulated. Thus, the pieces 23 can be attached with a high degree of positioning accuracy. Therefore, the width dimensions of the clearance 29, which is provided between the side mold main body 21 and each of the pieces 23, can be set with the high degree of accuracy.

Furthermore, in this embodiment, the outer-side inner wall surface 25a and the radial inner wall surface 25c of each of the recesses 25 do not directly abut each other, and both of the inner wall surfaces 25a, 25c are smoothly coupled via the curved surface 25d. Thus, an inner corner portion (a joined portion between the outer-side inner wall surface 25a and the radial inner wall surface 25c) of each of the recesses 25 can accurately be formed, and the clearance 29 provided around each of the pieces 23 can accurately be provided to have the desired widths. As a result, it is possible to suppress the rubber from spilling out of the excessively large clearance 29 or deficiency in air releasing performance caused by the excessively narrow clearance 29. Therefore, the shaping defect is unlikely to occur.

In this embodiment, the widths of the first clearances 29a and the second clearances 29b can easily be set to specified dimensions with the high degree of accuracy by fitting each of the pieces 23 into the recess 25 of the side mold main body 21, fixing each of the pieces 23 to the side mold main body 21 by the bolt or the like in a state where a tape-like spacer having a specified width and called a shim tape is held between the outer-side inner wall surface 25a of the recess 25 and the outer circumferential wall 23b of the piece 23 and between the radial inner wall surface 25c of the recess 25 and the side wall 23a of the piece 23, and thereafter removing the spacer to assemble the side mold 15.

In this embodiment, the width W3 of the third clearance 29c, which is provided between the inner-side inner wall surface 25b of the recess 25 and the inner circumferential wall 23c of the piece 23, is set to be greater than the width W1 of the first clearance 29a and the width W2 of the second clearance 29b. Thus, the third clearance 29c serves as an adjustment margin when a position of the piece 23 in the recess 25 is adjusted. Therefore, the widths of the first clearance 29a and the second clearance 29b can easily be set to the specified dimensions with the high degree of accuracy without hardly being influenced by shaping accuracy of the piece 23 and the recess 25.

In the side mold main body 21 of this embodiment, the annular projection 34, which is continuously provided in the circumferential direction, is provided on the outer side in the tire radial direction. Thus, the clearance 29 is not located in a portion where a buttress region (a region provided between the tread and each of the sidewalls), which is conspicuous in terms of external appearance of the tire, is shaped. Therefore, an unnecessary projection formed by the rubber that spills out of the clearance 29 is not formed in the buttress region.

When the green tire T is repeatedly vulcanized and shaped, a contaminant in gas that is produced during vulcanization molding is accumulated in the clearance 29 of the side mold 15. Thus, the side mold 15 has to be cleaned periodically. In this embodiment, the slit 27, which is provided in the side mold main body 21, is provided to overlap the first clearance 29a. Thus, by inserting a cleaning sheet having a specified thickness such as the spacer, which is used during the assembly of the side mold 15, in the slit 27 and the first clearance 29a, the contaminant accumulated in the first clearance 29a can easily be removed without detaching the piece 23 from the side mold main body 21.

The slit 27 provided in the side mold main body 21 is longer in the tire radial direction than the recess 25, into which the piece 23 is fitted. Thus, a portion near a corner of the recess 25, cleaning of which is difficult, can easily be cleaned by inserting the cleaning sheet in the slit 27.

Modified Embodiment

A description will be made on a modified embodiment of the first embodiment on the basis of FIG. 9. The same components as those in the above first embodiment will be denoted by the same reference signs, and the detailed description thereon will not made.

In the first embodiment described above, the description has been made on the case where the horizontal cross section of the curved surface 25d, which connects the outer-side inner wall surface 25a and the radial inner wall surface 25c of the recess 25, is the arcuate surface in the arcuate shape. However, the present invention is not limited thereto. The curved surface 25d only has to be a curved surface that smoothly connects the outer-side inner wall surface 25a and the radial inner wall surface 25c. For example, as illustrated in FIG. 9, a curved surface 25d' in which connected portions of the outer-side inner wall surface 25a and the radial inner wall surface 25c of the recess 25 are constructed of bent surfaces 25d'1 and are coupled by a flat surface section 25d'2 may be adopted.

Other Modified Embodiments

In the first embodiment, the description has been made on the tire vulcanizing mold 10 in which the first clearance 29a provided between each of the radial inner wall surfaces 25c, 25c of the recess 25 and each of the side walls 23a of the piece 23 linearly extends in a direction corresponding to the tire radial direction, and in which the second clearance 29b provided between the outer-side inner wall surface 25a of the recess 25 and the outer circumferential wall 23b of the piece 23 extends arcuately in a direction corresponding to the tire circumferential direction. However, the present invention is not limited thereto. For example, the first clearance 29a may extend linearly in a tilted direction with respect to the tire radial direction or may extend in a curved line shape from the inner side to the outer side in the tire radial direction. The second clearance 29b may extend in an offset direction from the tire circumferential direction in a manner to extend linearly or in a spiral shape. In such a case, in the recess 25, the inner wall surface, which extends from the inside to the outside in the tire radial direction, and the inner wall surface, which extends in the tire circumferential direction, are smoothly connected by the curved surface.

In the first embodiment, the slits 27 are provided in the tire radial direction along the radial inner wall surfaces 25c, 25c of the recess 25, and each of the slits 27 vertically overlaps the first clearance 29a. However, instead of these slits 27, or in addition to these slits 27, a slit that is provided along the outer-side inner wall surface 25a of the recess 25 to vertically overlap the second clearance 29b and that penetrates the base 24 of the side mold main body 21 may be provided.

The embodiments of the present invention have been described so far. These embodiments are merely provided as examples and thus have no intention of limiting the scope of the invention. These novel embodiments can be implemented in any of various other aspects, and various types of elimination, replacement, and changes can be made thereto within the scope that does not depart from the gist of the invention. These embodiments and the modifications thereof are included in the scope and the gist of the invention and are also included in the invention described in the claims and the equivalent scope thereof.

REFERENCE SIGNS LIST

10: Tire vulcanizing mold
14: Side mold
15: Side mold
15a: Side shaping surface
17: Bead ring
17a: Bead shaping surface
21: Side mold main body
23: Piece
23a: Side wall
23b: Outer circumferential wall
23c: Inner circumferential wall
24: Base
25: Recess
25a: Outer-side inner wall surface
25b: Inner-side inner wall surface
25c: Radial inner wall surface
25d: Curved surface
26: Projection
27: Slit
29: Clearance
30: Groove
32: Recessed groove
34: Annular projection
T: Green tire

The invention claimed is:

1. A tire vulcanizing mold that vulcanizes and shapes a tire, the tire vulcanizing mold comprising:
an upper and lower pair of side molds, each of which has a side shaping surface for shaping a sidewall of the tire, wherein
each of the side molds includes a side mold main body, plural pieces, and a clearance,
the side mold main body includes plural recesses, each of which is opened to the side shaping surface, at spaced intervals in a circumferential direction,
each of the pieces is fitted into the recess and forms the side shaping surface with the side mold main body,
the clearance is provided between the side mold main body and each of the pieces and is opened to the side shaping surface, and
each recess includes: an outer-side inner wall surface that defines an outer side in a tire radial direction; an inner-side inner wall surface that defines an inner side in the tire radial direction; a pair of radial inner wall surfaces that are located between the outer-side inner wall surface and the inner-side inner wall surface and define one side and the other side in a tire circumferential direction; and
a curved surface that connects the outer-side inner wall surface and a respective one of the radial inner wall surfaces.

2. The tire vulcanizing mold according to claim 1, wherein
the curved surface is an arcuate surface in an arcuate shape, a curvature radius of which is equal to or larger than 1 mm.

3. The tire vulcanizing mold according to claim 1, wherein
a distance between the inner-side inner wall surface and each of the pieces is equal to or longer than 0.5 mm, and a distance between each of the pieces and each of the outer-side inner wall surface and the radial inner wall surfaces is equal to or shorter than 0.05 mm.

* * * * *